United States Patent [19]

Sakamoto

[11] 3,829,178

[45] Aug. 13, 1974

[54] BEARING ARRANGEMENT

[75] Inventor: Hiroo Sakamoto, Tokyo, Japan

[73] Assignee: Akai Electric Company Limited, Tokyo, Japan

[22] Filed: Apr. 28, 1972

[21] Appl. No.: 248,405

[30] Foreign Application Priority Data
May 12, 1971   Japan.................................. 46-31749

[52] U.S. Cl. ................................................ 308/132
[51] Int. Cl. ............................................. F16c 1/24
[58] Field of Search............................ 308/132, 137

[56] References Cited
UNITED STATES PATENTS

| | | | |
|---|---|---|---|
| 2,316,693 | 4/1943 | Hoddy | 308/132 |
| 2,751,265 | 6/1956 | Wightman | 308/132 |
| 3,529,874 | 9/1970 | Hoddy | 308/132 |

*Primary Examiner*—Charles J. Myhre
*Assistant Examiner*—Frank Susko
*Attorney, Agent, or Firm*—Oblon, Fisher, Spivak, McClelland & Maier

[57]   ABSTRACT

A bearing arrangement for continuously circulating lubricating oil to sleeve-type bearings of electric motors, in particular small horsepower electric motors, having a first oil-impregnated fibrous material member, which serves as a lubricant reservoir for the bearing, in contact with a part of the outer peripheral surface of the bearing, and a second absorbent fibrous material member arranged adjacent an end surface of the bearing so as to absorb lubricating oil escaping from the bearing journal. The first and second fibrous material members are connected directly with each other or through an additional absorbent fibrous material member in a circuitous fashion. Thus, the lubricating oil circulates through the completed capillary return path and performs lubricating and cleaning actions for long periods of time throughout the life of the motor without replenishment.

4 Claims, 3 Drawing Figures

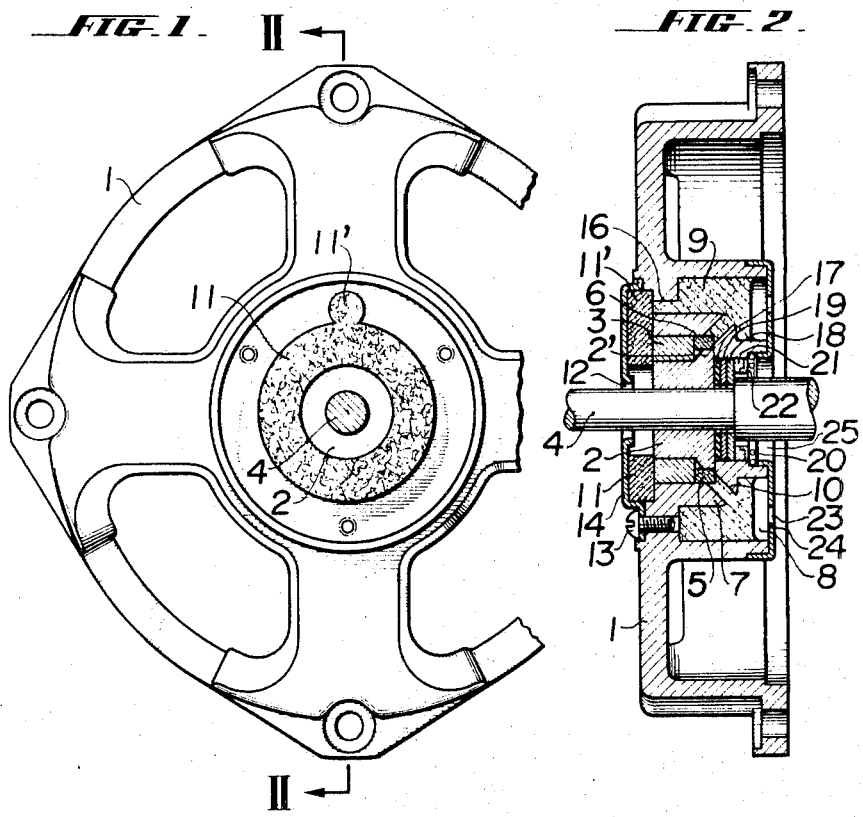
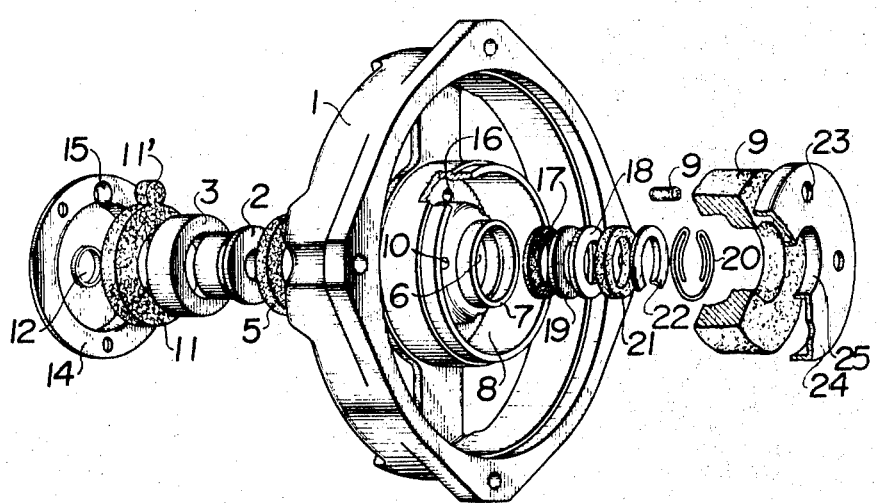

BEARING ARRANGEMENT

BACKGROUND OF THE INVENTION

1. Field Of The Invention

The present invention relates generally to a bearing arrangement for an electric motor, and more particularly to a sleeve-type bearing arrangement preferably used in small horsepower electric motors such as for a magnetic tape recording and reproducing machine, wherein a lubricating oil is continuously circulated through the arrangement.

2. Description Of The Prior Art

In machines, such as, for example, small horsepower electric motors in which shafts are rotatably journaled within sleeve-type bearings, it is important to provide proper lubrication to the journal surfaces during operation of the machines. It is therefore conventional to provide a lubricant reservoir, surrounding the sleeve-type bearings, which may be made of various materials, such as, for example, a permeable sintered material, hereinafter referred to as "oil impregnated metal," in which absorbent fibrous materials retain a lubricating oil to be fed to the journal surfaces through the sleeve-type bearings during operation of the machine.

In such a bearing arrangement, rotation of the shaft causes the lubricant contained in the bearing to be sucked into the clearance between the shaft and the bearing so as to produce an oil film therebetween which effectively permits smooth rotation of the shaft. Furthermore, the more lubricant that the oil-impregnated metal contains, the more lubricant is sucked out so that the oil film obtained is evenly distributed about the shaft. Under this condition, metal noise produced by rotation of the shaft is minimized or prevented, and the lubricant escaping from the clearance between the bearing and the shaft carries away metal powder created by abrasion therebetween, so that the journal surface is kept clean.

It is noted, however, that in order for the oil-impregnated metal to retain a sufficient amount of lubricant, it is necessary to supply lubricant from an external source to the absorbent fibrous material contained in the lubricant reservoir cavity throughout the operational period of the machine. This is, however, undesirable with respect to maintenance of the machine, and inconvenient for electric motors which are mounted at inaccessible locations and are required to operate for long periods of time without supervision.

SUMMARY OF THE INVENTION

Accordingly, it is an object of the present invention to provide an improved bearing arrangement for lubricating bearings of electric motors.

Another object of the present invention is to provide an improved bearing arrangement for lubricating bearings of electric motors which automatically continuously circulates lubricant throughout the arrangement in a circuitous fashion.

Still another object of the present invention is to provide an improved bearing arrangement for lubricating bearings of electric motors which does not require an external source of lubricant.

The foregoing objectives are achieved according to this invention through the provision of a bearing arrangement having an absorbent fibrous material arranged adjacent one end surface of the bearing which is directly connected with another absorbent fibrous material member contained in the lubricant reservoir cavity and/or indirectly connected therewith through additional absorbent fibrous material members. With this arrangement, then, the lubricant escaping from the clearance between the bearing and the shaft is automatically returned to the lubricant reservoir by capillary action and continuously re-cycled. In addition, no lubricant is consumed except for natural evaporation and small leakage along the shaft inwardly towards the center of the motor, and the lubricant is automatically fed throughout the system for long periods of use without additional supply thereof.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 1 is a fragmentary front elevation view of a bearing arrangement constructed according to this invention, with an end cap removed;

FIG. 2 is a longitudinal cross-section view of an assembled bearing arrangement as illustrated in FIG. 1, taken along the line II—II of FIG. 1; and FIG. 3 is an exploded perspective view of a bearing arrangement as illustrated in FIG. 2.

DETAILED DESCRIPTION OF THE ILLUSTRATED EMBODIMENT

Referring now to the drawings, there is shown a bearing arrangement constructed according to this invention. The electric motor with which the bearing arrangement is associated is a conventional one having a rotor mounted on a shaft, a stator enclosed in a housing, and brackets adapted to be attached to the housing, the motor having its shaft supported at both ends by sleeve-type bearings fitted within the brackets, respectively which may be identically constructed. For simplicity of illustration, however, one of the bearing arrangements and the other conventional parts of the motor are omitted from the drawings.

The bearing arrangement comprises a bracket 1 adapted to be secured by bolts to the housing, not shown, of the electric motor. The bracket 1 is provided with a central inner bore 6 into which a steel ring 3 is inserted, and an annular, oil-impregnated metal bearing 2 having a flange 2' at one end thereof is in turn inserted within the steel ring 3, with the flange 2' abutting an end face of steel ring 3. A shaft 4 of the motor is journaled within the oil-impregnated metal bearing 2, and a rotor of the motor, not shown, is mounted upon the shaft 4 at the right hand side of FIG. 2. Interiorly of the bracket inner bore 6, and surroundingly engaging the outer periphery of bearing flange 2' while simultaneously abutting steel ring 3, there is located a ring-shaped member 5, made of absorbent material, such as, for example, a felt wick. A ring-shaped cavity 8 surrounds the bracket inner bore 6 although cavity 8 is separated from the inner bore 6 by an axially extending tubular partition 7. The cavity 8 houses an annular member 9 made of an absorbent fibrous material, such as, for example, a material known as Permawick, hereinafter referred to as "oil-impregnated material," with a part of cavity 8 remaining unfilled, and cavity 8 serves as a lubricant reservoir for the present bearing arrangement.

There are a desired number of holes 10, such as, for example, four holes, in the embodiment shown in the drawings, passing through the tubular partition 7, and these holes are filled with oil-impregnated material similar to that comprising annular member 9 so that a fluid connection is made between the absorbent materials 5 and 9. It should be noted here that the density of the oil-impregnated metal or bearing 2 varies in an axial direction, that is, the density is greater at the outboard or leftside portion of the bearing 2, as viewed in FIG. 2, than at the inboard or right-side portion. This is because the shaft may be subject to forces perpendicular thereto by mechanical loads connected to the shaft during operation, and, under such conditions, the shaft is supported more at the outboard portion of the bearing 2, and accordingly it is preferable to provide higher mechanical strength or greater density in that portion.

Exteriorly of the bracket 1, there is located another ring-shaped member 11, made of absorbent material, such as, for example, felt wick, being arranged concentrically with respect to the shaft 4 and in abutting relationship with the outboard end surface of the steel ring 3. Member 11 is covered by an annular outboard cap 14 having a central opening 12 through which the shaft 4 may extend, and the cap 14 is fixed to the bracket 1 by screws 13. Furthermore, the absorbent material member 11 has a cylindrical projection 11' at its periphery which is contiguous with an outwardly projecting portion of the oil-impregnated material member 9, such portion extending through an axial hole 16 provided in the bracket 1. In turn, the cap 14 is provided with a cylindrical recess 15 (See FIG. 3) which receives the projection 11' of the absorbent material member 11. It is to be noted that the number of holes 16 is not limited to only one, since more than one such sole may possibly be provided.

Still referring to FIGS. 2 and 3, a rubber washer 17 is disposed upon the shaft 4 and is seated within the inner bore 6. The washer 17 serves to prevent the lubricant from leaking from the inboard end surface of the bearing 2 to other components of the arrangement, as well as serving to muffle the noise generated by rotation of the shaft 4 during operation of the motor. The washer 17 is also effective to determine the relative axial position of the shaft 4 in conjunction with a nylon washer 19 and a metal washer 18, all three washers being arranged in series fashion upon shaft 4. A ring-shaped oil-impregnated washer 21, made of material such as, for example, a felt wick, supplies a lubricating oil to the thrust surface of the shaft 4. A substantially U-shaped ring wire spring 20 holds the washers 17, 18, 19 and 21 in position through interengagement with another nylon washer 22. An annular inboard cap 24 covers the lubricant reservoir cavity 8 and is attached to the axially extending wall portion of the bracket 1. The cap 24 is provided with a central opening 25, through which the shaft 4 passes, and with four holes 23, the latter being intended to prevent an excessive pressure rise within the cavity 8 due to an increase in temperature.

Referring now to FIG. 2, it is seen that with the bearing arrangement constructed as described above, the lubricant contained in the annular oil-impregnated-metal member or bearing 2 is sucked out to the clearance between the bearing 2 and the shaft 4 and is caused to flow out of the clearance along the shaft 4, by a suction action produced by rotation of the shaft 4. The lubricant escaping from the clearance continues to flow along the outboard end surface of the bearing 2 or is thrown out tangentially of the shaft 4 by centrifugal action, and is consequently absorbed by the second absorbent material member 11. Upon saturation of the absorbent material member 11 with the lubricant, excess lubricant is then returned, to the first absorbent material member 9 or the lubricant reservoir cavity 8 through the projection 11' of the material member 11 and the projecting portion of absorbent material member 9 extending through the hole 16 of bracket 1, by capillary attraction between the first and the second absorbent material members 9 and 11. It should be understood that the first absorbent material member 9 should preferably be impregnated with the lubricant to such an extent that the material of member 9 is not saturated at operative temperature, while the second absorbent material member 11 should preferably be saturated with the lubricant. It is also noted that provision of the hole 16 at the upper part of the bracket 1 as shown in the drawings, expedites permeation of the lubricant into the upper portion of the oil-impregnated material of member 9 which is liable to be of low density of the lubricant, thereby speeding up circulation thereof, or so as to establish a positive capillary flow toward the lubricant reservoir.

In addition, it is important to note that use of a material within the first absorbent fibrous material member 9, such as, for example, Permawick, having a larger oil-impregnation capacity as compared with the second absorbent material member 11, enables the lubricant to permeate rapidly and smoothly from the second material member 11 back to the first material member 9.

Also note that the lubricant which has reached the oil-impregnated material member 9 is cooled by ambient air through the holes 23 of the inboard cap 24, and the shortcomings caused by excessive temperature rise of the lubricant, such as, for example, deterioration of the lubricant and burning of the journal due to too thin an oil film, are avoided. The cooling effect of the lubricant can be further heightened by an air-cooling fan mounted upon the motor shaft 4.

Thus, in the manner described above, the lubricant is automatically circulated and the bearing can always keep the lubricant therein. The circulating lubricant flow containing metal abrasion powder through the capillary return path causes the same to be filtered by the absorbent fibrous material members 5, 9, and 11. Pure lubricant is thus fed to the bearing 2.

Thus it may be seen that the bearing arrangement of the present invention has important advantages over the known prior art structures in that the arrangement of the present invention provides for an automatic, positive-flow, circulation system for lubricating the motor bearings, the lubricant being continuously recycled, and wherein the system does not require supplemental lubricant from an external source.

Obviously, many modifications and variations of the present invention are possible in light of the above teachings. It is to be understood, therefore, that within the scope of the appended claims, the present invention may be practiced otherwise than as specifically described herein.

What is claimed as new and desired to be secured by Letters Patent of the United States is:

1. A bearing arrangement for an electric motor having a rotor mounted on a shaft, a stator enclosed in a housing, and a bracket adapted to be attached to the housing and to receive said shaft, said arrangement comprising:

a sleeve-type bearing supported by said bracket being made of an oil-impregnated metal for journaling the shaft of the motor;

means defining an annular cavity in said bracket about said bearing having at least one opening therein for providing a fluid connection between said cavity and said bearing;

a first oil-impregnated fibrous material member disposed in said cavity for feeding lubricant directly to said bearing through said at least one opening in said cavity defining means in said bracket;

absorbent material filling said at least one opening in said cavity defining means of said bracket and interposed between said cavity defining means of said bracket and said bearing for supplying said lubricant from said first oil-impregnated material directly to said bearing;

a second oil-impregnated fibrous material member disposed adjacent at least one end surface of said bearing for absorbing the lubricant escaping from the clearance between said bearing and said shaft;

said first oil-impregnated fibrous material member having a higher oil impregnation capacity and larger volume than said second oil-impregnated fibrous material member; and wherein said first and second oil-impregnated fibrous material members are connected with each other through additional absorbent fibrous material for circulating said lubricant from said second oil-impregnated fibrous material member to said first oil-impregnated fibrous material member such that a circuitous flow of said lubricant occurs.

2. A bearing arrangement as set forth in claim 1, wherein said first and second oil-impregnated fibrous material members are directly connected to each other.

3. A bearing arrangement as set forth in claim 1, further comprising oil-impregnated material filling said at least one opening in said cavity defining means of said bracket.

4. A bearing arrangement for an electric motor having a rotor mounted on a shaft, a stator enclosed in a housing, a bracket adapted to be attached to the housing and to receive said shaft, said arrangement comprising:

a sleeve-type bearing supported by said bracket being made of an oil-impregnated metal for journaling the shaft of the motor;

means defining an annular cavity in said bracket about said bearing having at least one opening therein for providing a fluid connection between said cavity and said bearing;

a first oil-impregnated fibrous material member disposed in said cavity for feeding lubricant to said bearing through said at least one opening in said cavity defining means in said bracket;

a second oil-impregnated fibrous material member disposed adjacent at least one end surface of said bearing for absorbing the lubricant escaping from the clearance between said bearing and said shaft; and an inboard cap secured to said bracket and having a plurality of holes to relieve excess pressure and temperatures within said lubricant cavity;

wherein said first and second oil-impregnated fibrous material members are connected with each other.

* * * * *